(12) United States Patent
Radlicz et al.

(10) Patent No.: US 9,377,199 B2
(45) Date of Patent: Jun. 28, 2016

(54) METHODS OF REINFORCING COMBUSTOR APERTURE AND RELATED COMBUSTOR

(71) Applicant: General Electric Company, Schenectady, NY (US)

(72) Inventors: Andrzej Jacek Radlicz, Warsaw (PL); Kamil Bazyli Kaczorowski, Warsaw (PL); Mariusz Grzegorz Karpinski, Warsaw (PL); Damian Strzelec, Grodzisk Mazowiecki (PL)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/124,874

(22) PCT Filed: Dec. 28, 2012

(86) PCT No.: PCT/PL2012/000133
§ 371 (c)(1),
(2) Date: Dec. 9, 2013

(87) PCT Pub. No.: WO2014/104901
PCT Pub. Date: Jul. 3, 2014

(65) Prior Publication Data
US 2015/0292740 A1     Oct. 15, 2015

(51) Int. Cl.
*F23R 3/00*     (2006.01)
*B23P 6/00*     (2006.01)
*F23R 3/06*     (2006.01)

(52) U.S. Cl.
CPC ............... *F23R 3/002* (2013.01); *B23P 6/002* (2013.01); *F23R 3/06* (2013.01); *B23P 2700/13* (2013.01); *F23R 2900/00019* (2013.01); *Y10T 29/49323* (2015.01)

(58) Field of Classification Search
CPC ...... B23P 6/002; B23P 2700/13; F23R 3/002; F23R 3/06; F23R 2900/00019; B23K 33/002; B23K 33/004; B23K 33/006; B23K 33/008; B23K 9/0213; B23K 9/028; B23K 9/0282; B23K 9/0284; B23K 9/0286; B23K 11/093; B23K 11/0935; B23K 1/0018; B23D 37/04; B23D 37/10; B23D 37/25; B23D 2043/025
See application file for complete search history.

(56) References Cited

U.S. PATENT DOCUMENTS 1,958,705 A * 5/1934 Klein ..................... B23D 37/10
269/234
3,453,826 A * 7/1969 Hering ..................... F23C 7/00
60/740

(Continued)

FOREIGN PATENT DOCUMENTS

JP     60-194234     10/1985

OTHER PUBLICATIONS

International Application No. PCT / PL2012 / 000133, International Search Report and Written Opinion, dated Sep. 9, 2013, 11 pages.

*Primary Examiner* — Jason L Vaughan
(74) *Attorney, Agent, or Firm* — Ernest G. Cusick; Hoffman Warnick LLC

(57) ABSTRACT

Various embodiments include methods of reinforcing apertures in turbomachine combustors, and related combustors. In various particular embodiments, a method of reinforcing an existing turbomachine combustor aperture includes: broaching the existing aperture to modify an initial profile of the existing aperture and form a modified profile, where the modified profile protrudes radially outwardly from an outer surface of the turbomachine combustor; and welding a combustor ring along an inner surface of the modified profile, where the modified profile enhances bonding between the existing aperture and the combustor ring.

15 Claims, 8 Drawing Sheets

(56) References Cited

U.S. PATENT DOCUMENTS

| | | |
|---|---|---|
| 3,851,627 A | 12/1974 | Terazawa |
| 5,209,067 A | 5/1993 | Barbier et al. |
| 6,027,124 A | 2/2000 | Ishida et al. |
| 8,096,277 B2 | 1/2012 | Fornara et al. |
| 8,448,443 B2 * | 5/2013 | Berry ...................... F23R 3/045 60/754 |
| 2007/0227149 A1 | 10/2007 | Biebel et al. |
| 2009/0120095 A1 * | 5/2009 | Berry ...................... F23R 3/045 60/754 |
| 2010/0319656 A1 | 12/2010 | Clarke |
| 2012/0036859 A1 | 2/2012 | Johnson et al. |

\* cited by examiner

METHODS OF REINFORCING COMBUSTOR APERTURE AND RELATED COMBUSTOR

FIELD OF THE INVENTION

The subject matter disclosed herein relates to reinforced materials. More particularly, the subject matter relates to reinforced materials in combustor systems.

BACKGROUND OF THE INVENTION

Conventional combustors, such as turbomachine combustors, include a variety of apertures which aid the combustor in performing its designed functions. For example, combustors can include cross-fire apertures for enhancing firing, and mixing and dilution apertures for providing air to the combustion chamber.

Due to the temperature and pressure conditions within combustors, these apertures are frequently reinforced. Conventionally, these apertures are reinforced using a reinforcing sleeve which is applied to the aperture and welded in place.

The geometry of the reinforcing sleeve results in a high temperature gradient on the reinforcing sleeve during operation of the combustor, which can cause the sleeve to fail. Further, welding the sleeve effectively can be difficult due to limited access to the aperture.

BRIEF DESCRIPTION OF THE INVENTION

Various embodiments include methods of reinforcing apertures in turbomachine combustors, as well as related combustors. In various particular embodiments, a method of reinforcing an existing turbomachine combustor aperture includes: broaching the existing aperture in the turbomachine combustor to modify an initial profile of the existing aperture in the turbomachine combustor and form a modified profile, wherein the initial profile is substantially co-planar with an outer surface of the turbomachine combustor, and wherein the modified profile protrudes radially outward from the outer surface of the turbomachine combustor; and welding the existing aperture to a combustor ring, wherein the modified profile enhances bonding between the existing aperture and the combustor ring.

A first aspect of the invention includes a method of reinforcing an existing turbomachine combustor aperture. This method can include: broaching the existing aperture in the turbomachine combustor to modify an initial profile of the existing aperture in the turbomachine combustor and form a modified profile, wherein the initial profile is substantially co-planar with an outer surface of the turbomachine combustor, and wherein the modified profile protrudes radially outward from the outer surface of the turbomachine combustor; and welding the existing aperture to a combustor ring, wherein the modified profile enhances bonding between the existing aperture and the combustor ring.

A second aspect of the invention includes a method of reinforcing an existing turbomachine combustor aperture. The method can include: forming the aperture in a surface of the turbomachine combustor; broaching the aperture in the turbomachine combustor to modify an initial profile of the aperture in the turbomachine combustor and form a modified profile, wherein the broaching includes: inserting a broaching tip having a broaching surface into the existing aperture; and machining the initial profile of the existing aperture to form the modified profile, wherein the modified profile includes a greater surface area than the initial profile; and machining the modified profile to form a smooth, modified profile.

A third aspect of the invention includes a turbomachine combustor including: a wall having: a radially inner surface and a radially outer surface; and an aperture extending between the radially inner surface and the radially outer surface, the aperture including one of a mixing aperture or a dilution aperture, the aperture having: an arcuate interface proximate the radially inner surface; and a protruding interface extending radially outward from the radially outer surface; and a combustor ring fillet welded to the wall at the aperture along the arcuate interface.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
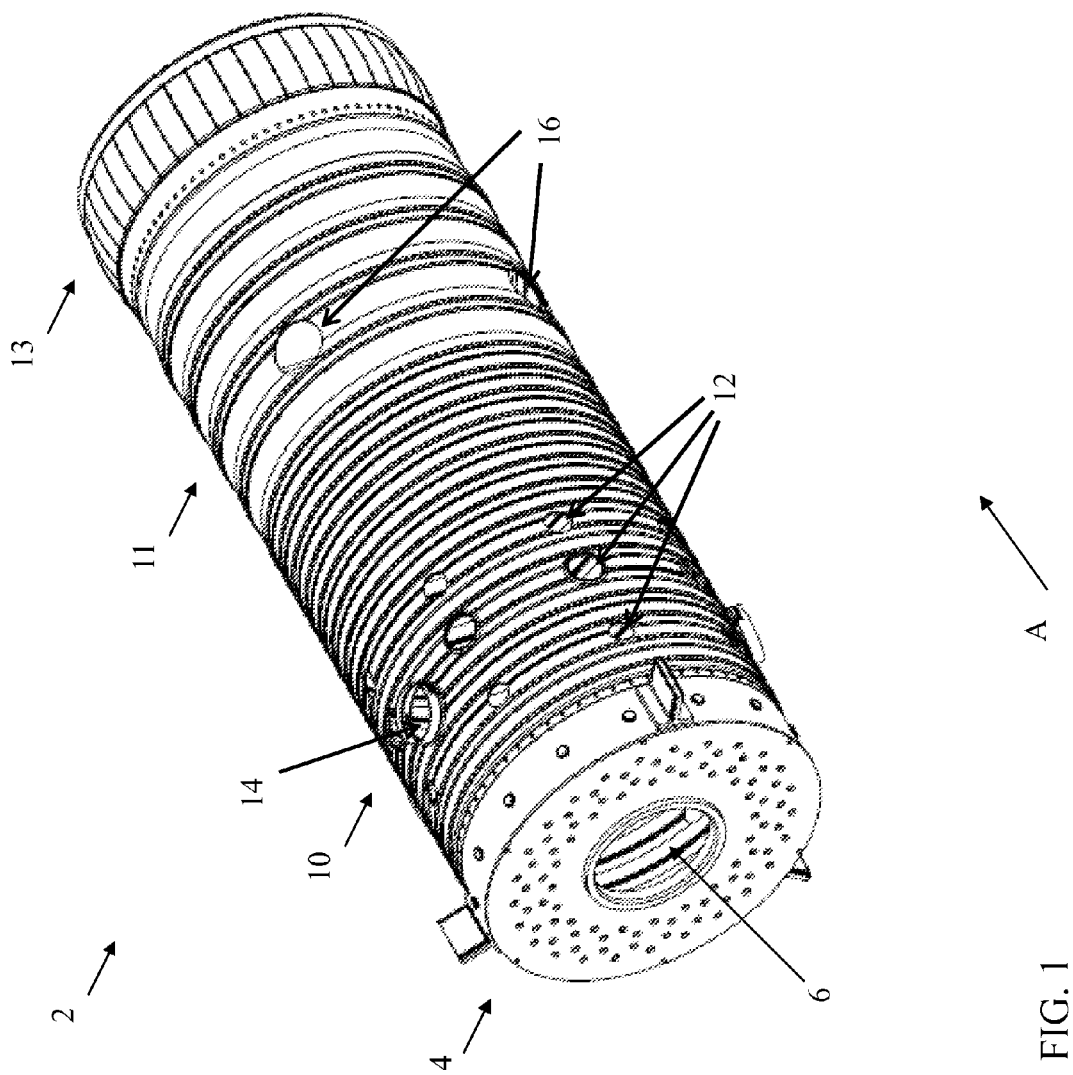
FIG. 1 shows a three-dimensional perspective view of a portion of a turbomachine combustor according to various embodiments of the invention.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As noted, the subject matter disclosed herein relates to reinforced materials. More particularly, the subject matter relates to reinforced materials in combustor systems.

As described herein, due to the temperature and pressure conditions within combustors, these apertures are frequently reinforced. Conventionally, these apertures are reinforced using a reinforcing sleeve which is applied to the aperture and welded in place.

The geometry of the sleeve results in a high temperature gradient on the sleeve during operation of the combustor, which can cause the reinforcing sleeve to fail. Further, welding the sleeve effectively can be difficult due to limited access to the aperture.

In contrast to conventional approaches, various embodiments include methods of reinforcing combustor apertures via broaching to form eyelets. In particular, various embodiments of the invention include reinforcing the edges of a mixing aperture or dilution aperture in a turbomachine combustor by forming eyelets within those apertures.

In particular embodiments, the method can include reinforcing an existing turbomachine combustor aperture by: broaching the existing aperture to modify a profile of the existing aperture and form a modified profile; and fillet welding a combustor ring to the modified profile to bond the combustor ring to the aperture.

Various particular embodiments of the invention include a method of reinforcing an aperture in a turbomachine combustor. This method can include: forming the aperture in a surface of the turbomachine combustor; broaching the aperture to modify an initial profile of the aperture and form a modified profile; and machining an inner diameter of the modified profile to smooth the modified profile (e.g., to remove one or more burrs).

Various particular embodiments of the invention include a method of reinforcing an existing turbomachine combustor aperture. This method can include: broaching the existing aperture in the turbomachine combustor to modify an initial profile of the existing aperture in the turbomachine combustor and form a modified profile, wherein the initial profile is substantially co-planar with an outer surface of the turbomachine combustor, and wherein the modified profile protrudes radially outwardly from the outer surface of the turbomachine combustor; and fillet welding the existing aperture to a combustor ring, wherein the modified profile enhances bonding between the existing aperture and the combustor ring.

Various other embodiments of the invention include a method of reinforcing an existing turbomachine combustor aperture. The method can include: forming the aperture in a surface of the turbomachine combustor; broaching the aperture in the turbomachine combustor to modify an initial profile of the aperture in the turbomachine combustor and form a modified profile, wherein the broaching includes: inserting a broaching tip having a broaching surface into the existing aperture; and machining the initial profile of the existing aperture to form the modified profile, wherein the modified profile includes a greater surface area than the initial profile; and machining the modified profile to form a smooth, modified profile.

Various additional embodiments of the invention include a turbomachine combustor including: a wall having: a radially inner surface and a radially outer surface; and an aperture extending between the radially inner surface and the radially outer surface, the aperture including one of a mixing aperture or a dilution aperture, the aperture having: an arcuate interface proximate the radially inner surface; and a protruding interface extending radially outward from the radially outer surface; and a combustor ring fillet welded to the wall at the aperture along the arcuate interface.

As used herein, the terms "axial" and/or "axially" refer to the relative position/direction of objects along axis A, which is substantially perpendicular to the axis of rotation of the turbomachine (in particular, the rotor section). As further used herein, the terms "radial" and/or "radially" refer to the relative position/direction of objects along axis (r), which is substantially perpendicular with axis A and intersects axis A at only one location. Additionally, the terms "circumferential" and/or "circumferentially" refer to the relative position/ direction of objects along a circumference (C) which surrounds axis A but does not intersect the axis A at any location.

Turning to FIG. 1, a three-dimensional perspective view of a portion of a turbomachine combustor (or simply, combustor) 2 is shown according to various embodiments. As shown, fuel is provided to a combustor cap section 4, at its inlet 6, via a fuel nozzle system (not shown) and initially mixed with air going through the cap section 4, as is known in the art. Then, the mixture ignites from a spark initiated in an igniter (not shown), as is known in the art. In the primary flame zone 10, the flame is additionally mixed with air flowing through mixing holes 12 in order to assure that the fuel is properly burned. Also, the flame is transferred to adjacent combustors (obstructed in this view) through cross-fire holes 14, as is known in the art. At the aft end 11 of the combustor 2, the flame is diluted with air flowing through dilution holes 16 to properly mix the flame with air in the aft end 11 and cool the flame to reduce emissions. The aft end 11 of the combustor 2 includes an outlet 13 designed to connect with a transition piece, and ultimately, a turbomachine (both not shown).

As described herein, during operation of a conventional turbomachine combustor, the inherent temperature and pressure conditions can cause material degradation including fatigue, cracking, erosion, etc., in various components in the combustor. In particular, this material degradation can affect the mixing and/or dilution apertures. According to various embodiments, methods are disclosed which help to reinforce those mixing and/or dilution apertures.

Figure 2:
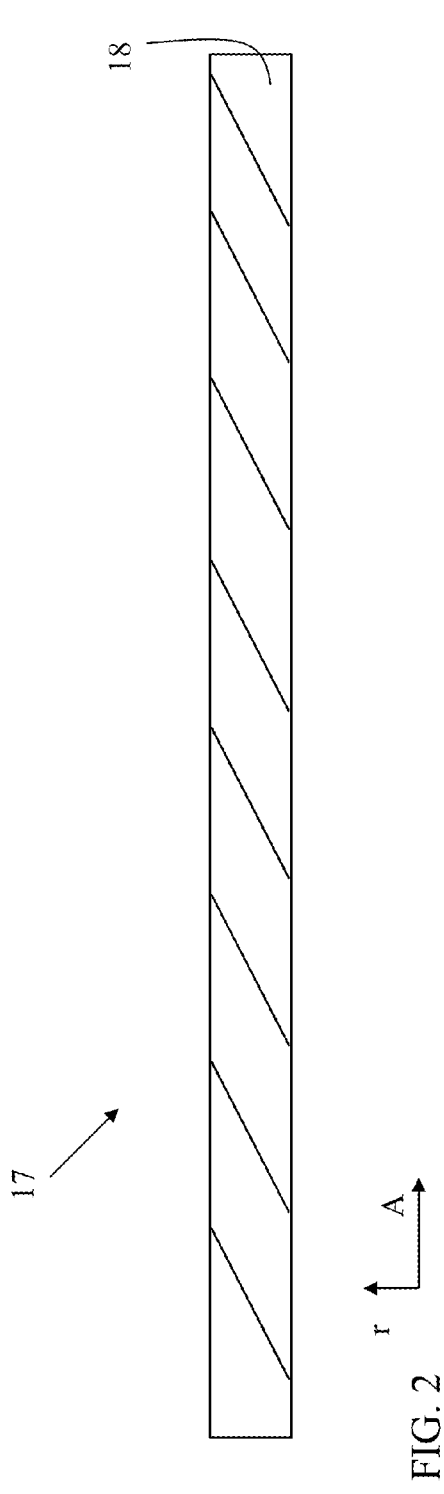
FIGS. 2-3 show a cut-away cross-sectional view of processes in forming a turbomachine combustor aperture according to various embodiments of the invention.
Figure 3:
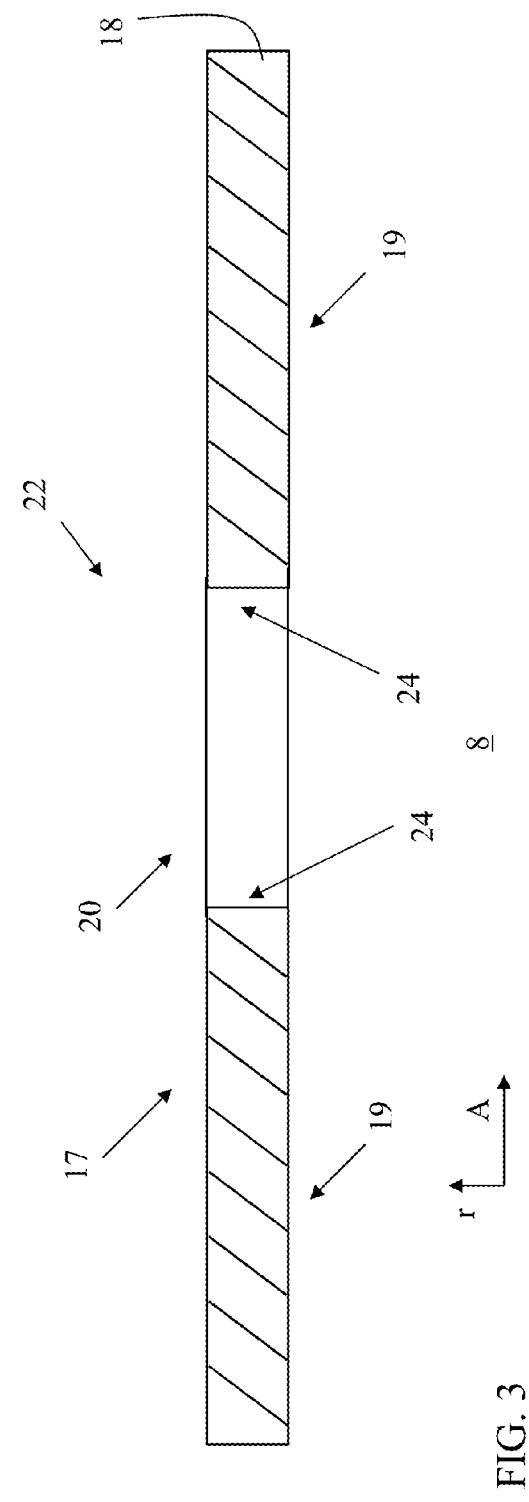

FIG. 2 shows a schematic cross-sectional cut-away view of a surface 17 of the combustor 2 prior to forming of one or more of the apertures (e.g., mixing aperture 12, cross-fire aperture 14, etc.). Various embodiments include a preliminary step of forming one or more apertures (e.g., mixing aperture 12, cross-fire aperture 14, etc.), e.g., via punching, cutting, or otherwise puncturing the wall 18 of the combustor 18. FIG. 3 shows a schematic cross-sectional cut-away view of an inlet 20 of an aperture 22 formed according to the preliminary processes described herein. After formation of the aperture 22, the aperture 22 is referred to as an "existing" aperture herein.

The existing aperture 22, can include, e.g., a mixing aperture 12 or a dilution aperture 16 as shown and described with reference to FIG. 1. As shown, the existing aperture 22 has an initial profile 24, which can be substantially planar, e.g., perpendicular to a central axis A of the combustor. Additionally, the initial profile 24 can also be substantially planar along the outer surface 17 (radially outer surface) of the combustor's wall 18. That is, the initial profile 24 is substantially coplanar with the outer surface 17 of the combustor wall 18.

Figure 4:
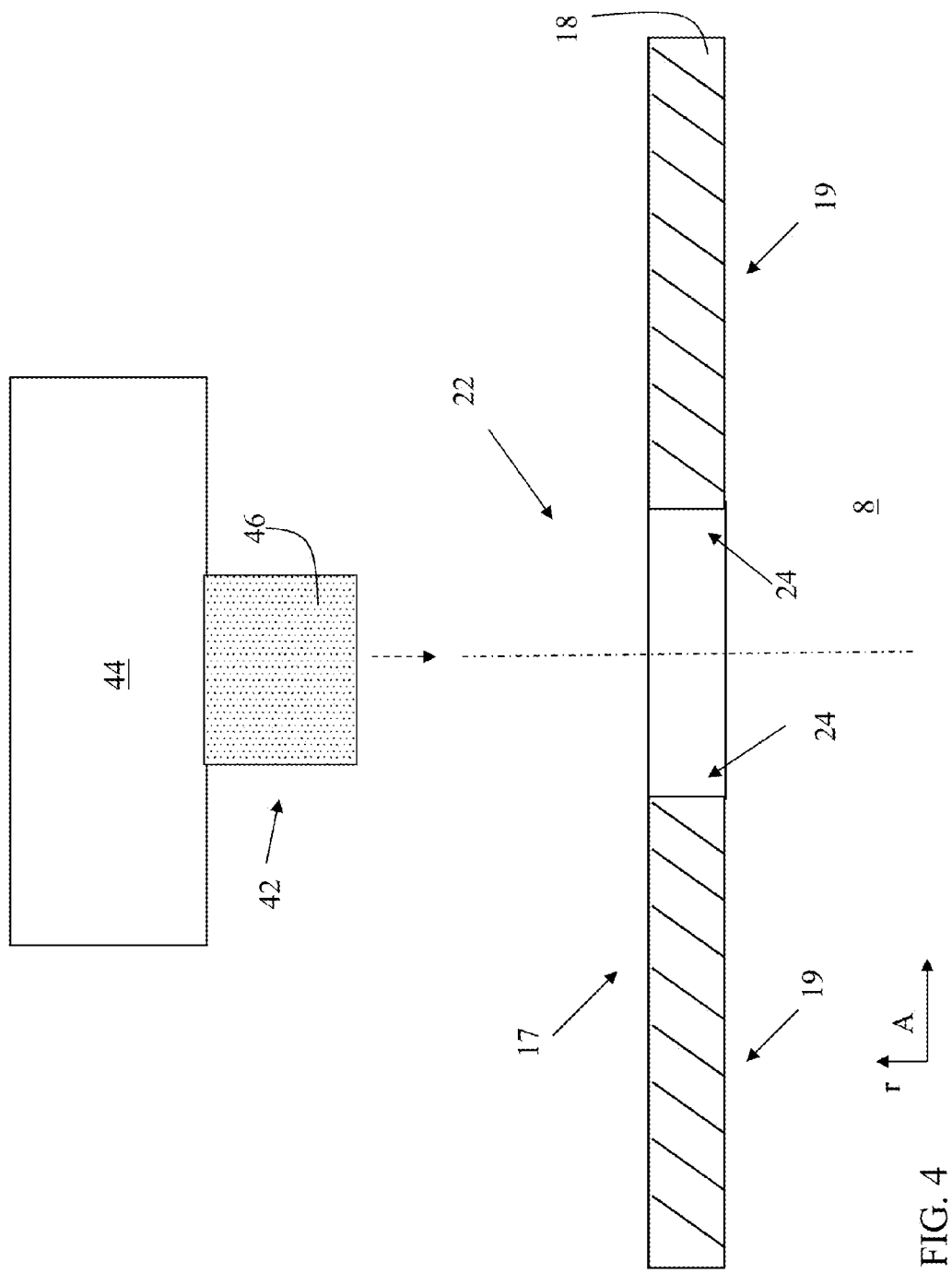
FIG. 4 shows a cut-away cross-sectional view of the turbomachine combustor aperture of FIG. 3 undergoing processes according to various embodiments of the invention.
Figure 5:
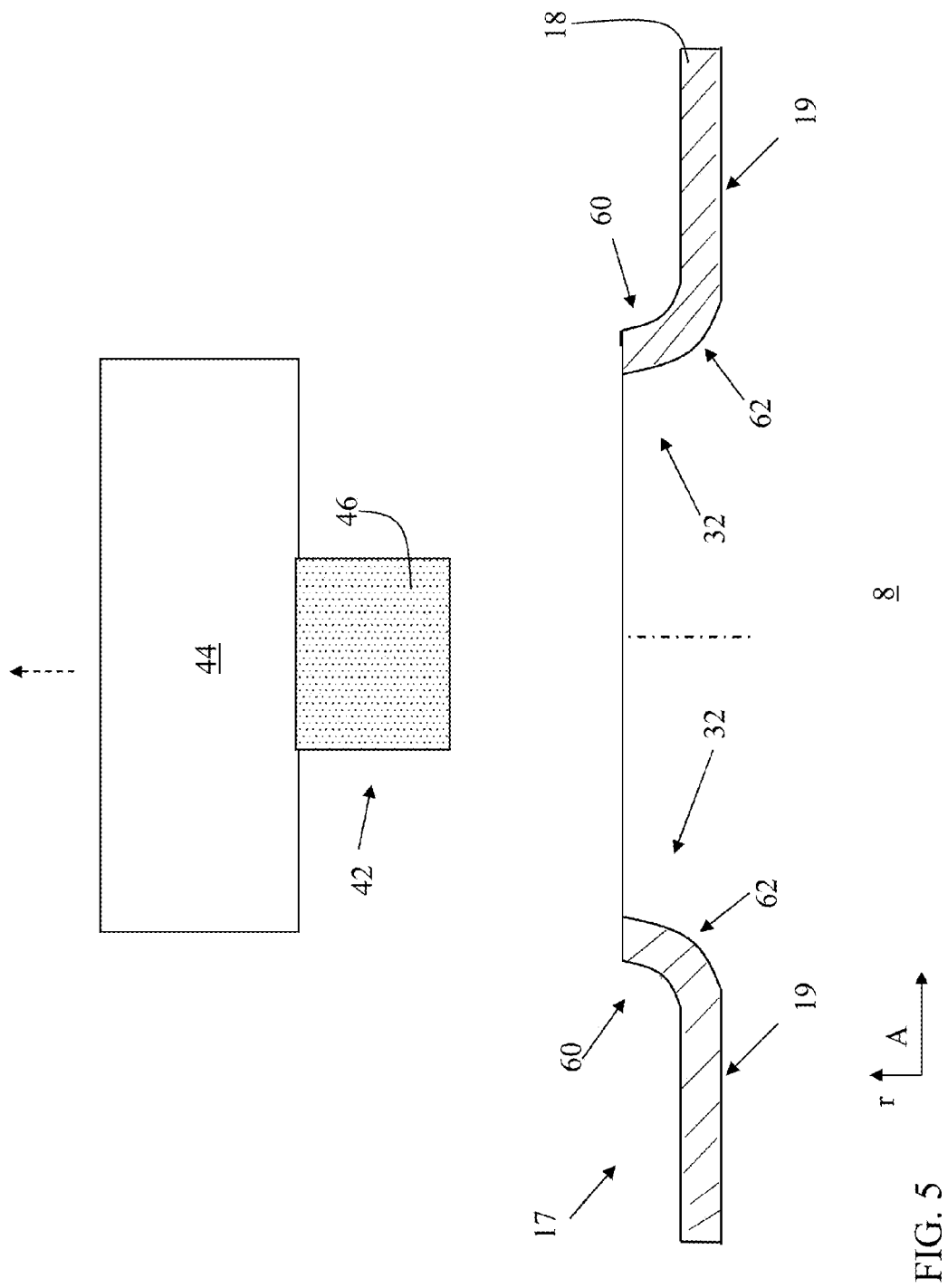
FIG. 5 shows a cut-away cross-sectional view of the turbomachine combustor aperture of FIG. 4 undergoing processes according to various embodiments of the invention

FIGS. 4-5 illustrate the process of broaching (machining) the existing aperture 22 from FIG. 3 to modify the initial profile 24 (e.g., the substantially planar profile) and form a modified profile 32 (FIG. 5). According to various embodiments, the modified profile 32 can also be smoothed, e.g., via conventional machining techniques such as sanding. The modified profile 32 is shown as smoothed in FIG. 5. The modified profile 32 is substantially non-planar, and in some cases, has a greater surface area than the initial profile 24.

In various embodiments, the modified profile 32 includes a protruding interface (or protrusion) 60 extending radially outwardly from the radially outer surface 17 of the wall 18. That is, the modified profile 32 is substantially non-planar with the outer surface 17 of the wall 18. The modified profile 32 can include an arcuate interface 62 proximate the radially inner surface 19 of the wall 18, which increases the surface area of the inner surface (e.g., inner surface 19 and arcuate interface 62) relative to the inner surface of the initial profile 24.

Figure 6:
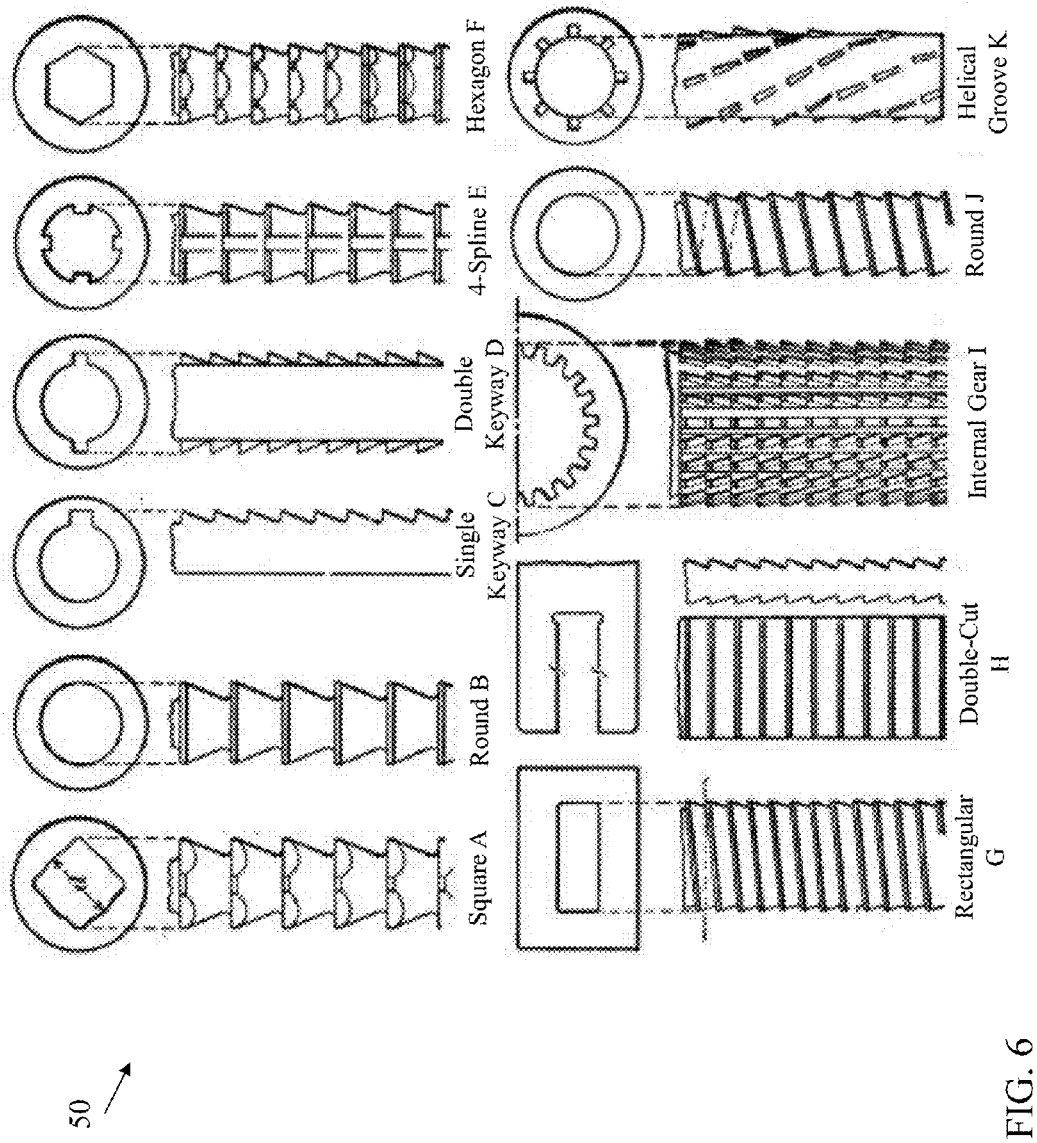
FIG. 6 shows a schematic depiction of broaching device tips which can be utilized in methods according to various embodiments of the invention.

In various embodiments, the broaching process can include inserting a broaching tip 42 (FIGS. 4-5, 7) from a broaching member 44 into the existing aperture 22, and machining the initial profile 24 of the existing aperture 22 to form the modified profile 32. In various cases, the broaching tip 42 includes a broaching surface 46 (indicated as having some texture). In some cases, the broaching surface 46 includes at least one of a group of surfaces. This group of surfaces is shown in the illustrative broaching surface chart 50 in FIG. 6, where broaching surface types A-K are shown in top and side views, respectively (top view shown above the side view for each broaching surface type). As shown, the broaching surface 46 of the broaching tip 42 (FIGS. 2-3) can include at least one of: a square surface (type A), a round surface (type B), a single keyway surface (type C), a double keyway surface (type D), a 4-spline surface (type E), a hexagon surface (type F), a rectangular surface (type G), a double-cut surface (type H), an internal gear surface (type I), a round helical surface (type J) or a helical groove surface (type K).

Figure 7:
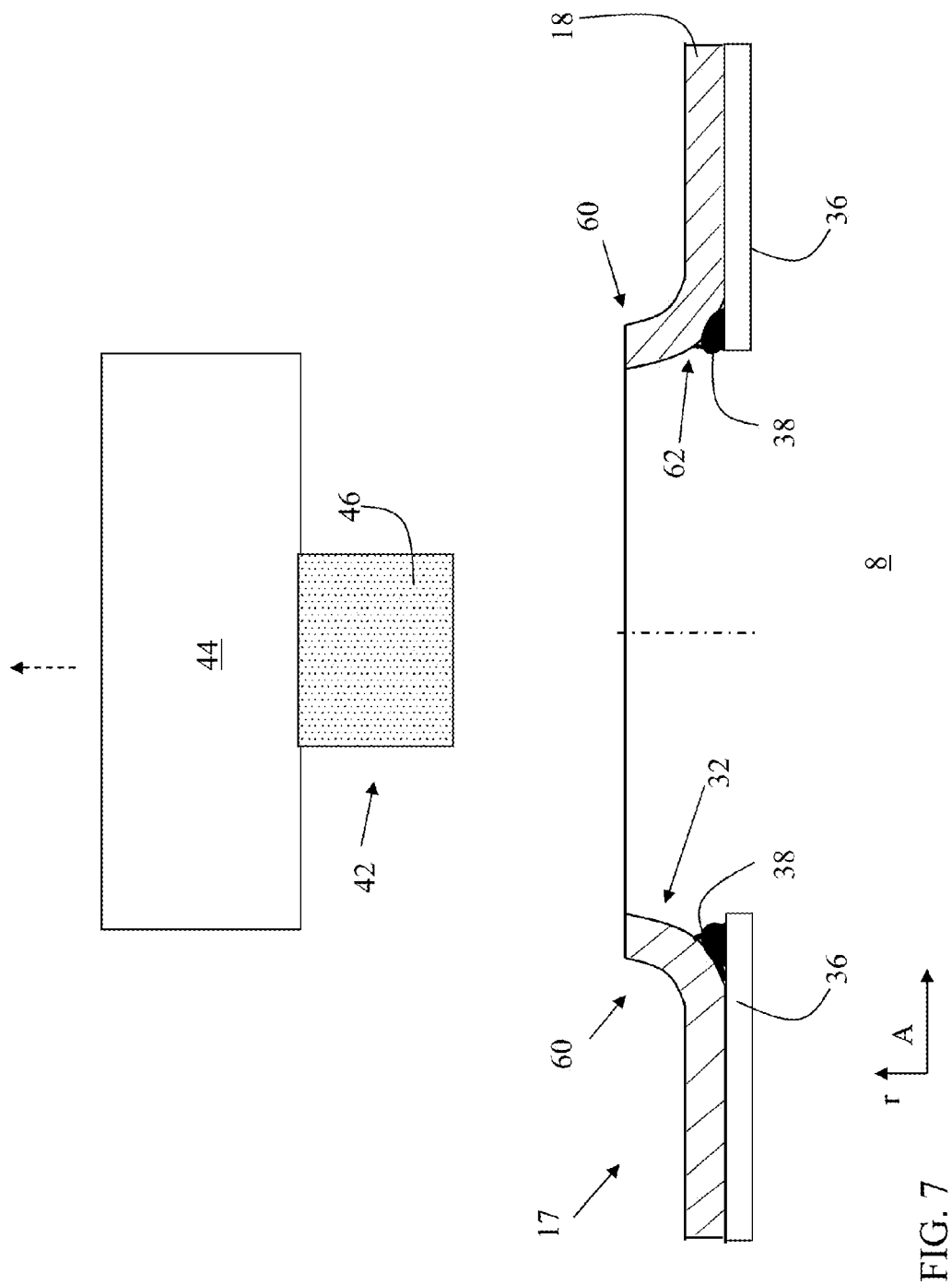
FIG. 7 shows an alternative process of forming a turbomachine combustor aperture according to various embodiments of the invention.

According to another aspect of the invention, shown in FIG. 7 is a combustor ring 36 which can be positioned adjacent to the inner diameter of the modified profile 32 (e.g., proximate the arcuate interface 62) and welded to the modified profile 32 according to various embodiments of the invention. The combustor ring 36 can be welded, e.g., via fillet welding, to the radially inner surface 19 along an outer diameter of the reinforcing ring and the inner diameter (radially inner surface 19) of the wall 17, in particular, along the modified profile 32. The weld 38 is shown between the combustor ring 36 and the modified profile 32 (contacting the arcuate interface 62 and the combustor ring 36. The modified profile 32, in particular, the greater surface area of the modified profile 32 as compared with the initial profile 24, enhances bonding between the combustor ring 36 and the wall 17 of the combustor 2 (FIG. 1)(after the fillet welding process is complete). In some cases, the combustor ring 36 is inserted within the combustor 2 and welded to the wall 17, and then an opening corresponding with the aperture 22 is formed in the combustor ring 36, e.g., via cutting or machining the opening through the aperture 22 to expose the interior chamber 8 of the combustor 2.

Figure 8:
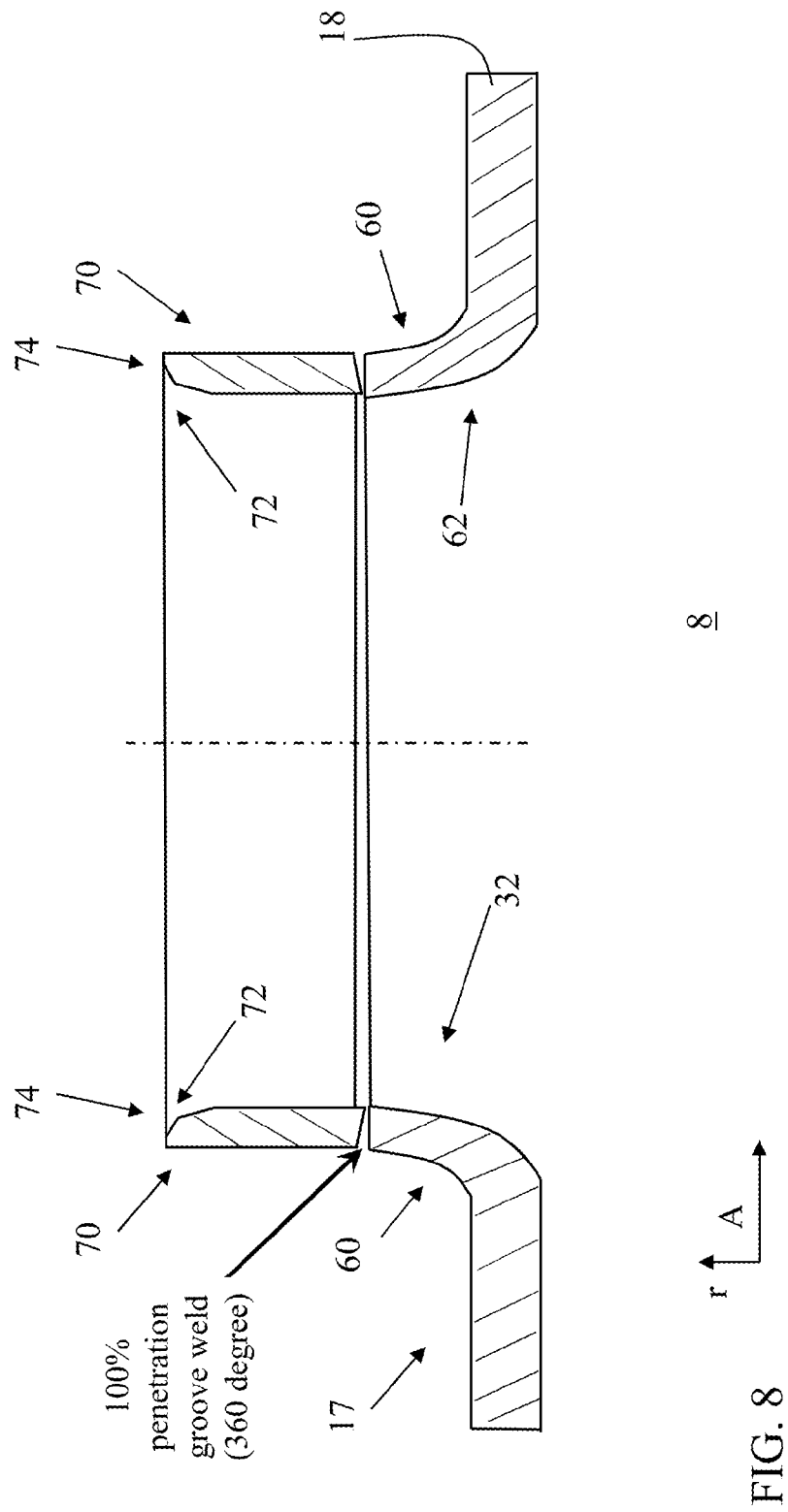
FIG. 8 shows an alternative embodiment of forming a turbomachine combustor aperture according to various embodiments of the invention.

FIG. 8 shows an alternative embodiment including a process of forming a weld collar 70 coupled to the modified profile 32, e.g., extending radially outwardly from the modified profile 32. In particular, the weld collar 70 is formed as a 360 degree, 100 percent penetration weld over the protrusion (or, protruding interface) 60, which extends radially outwardly from the protrusion 60. The weld collar 70 can be formed after the modified profile 32 is formed, e.g., after the modified profile 32 has been smoothed. In some cases, the weld collar 70 can be formed including a beveled or chamfered surface 72 along its inner diameter proximate its radially outermost point 74.

Figure 9:
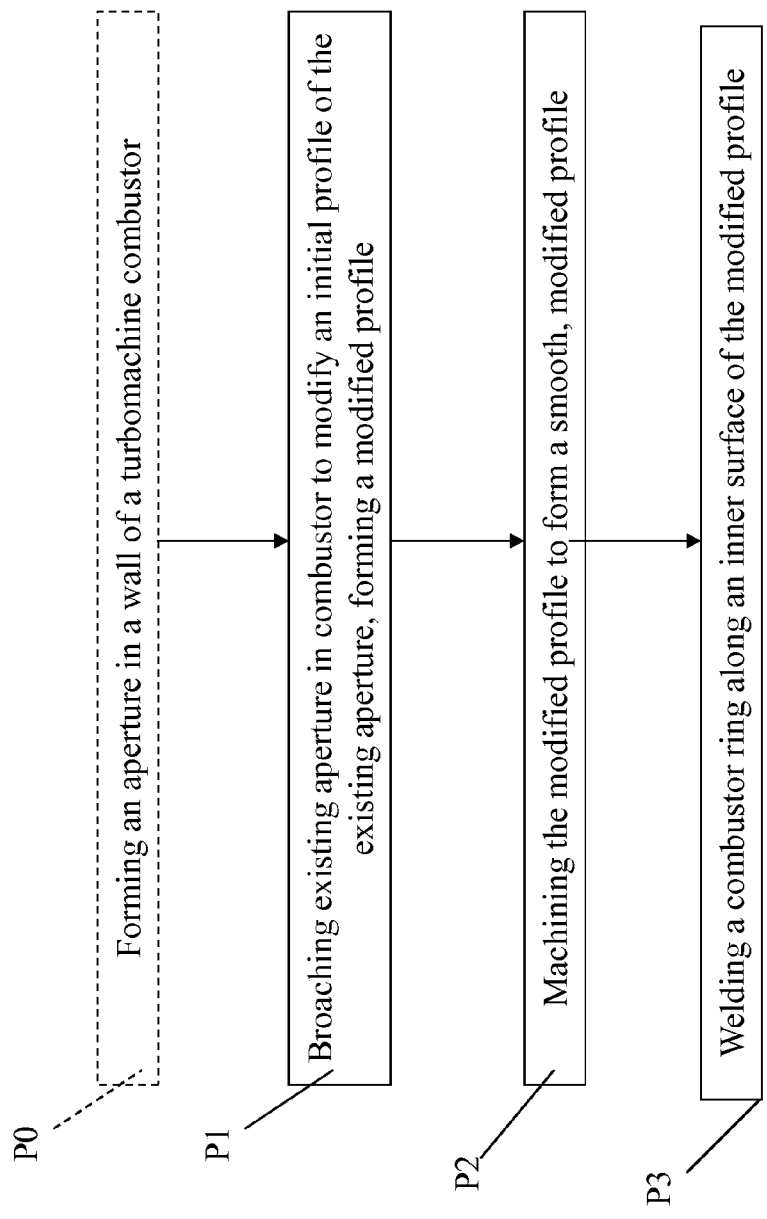
FIG. 9 is a flow diagram depicting processes according to various embodiments of the invention.

FIG. 9 is a flow diagram illustrating processes that may be performed according to various embodiments of the invention. As shown, the processes can include:

Process P0 (Preliminary optional process): Forming an aperture in a wall of a turbomachine combustor;

Process P1: Broaching the existing aperture in the turbomachine combustor to modify an initial profile of the existing aperture and form a modified profile;

Process P2: Machining the modified profile to form a smooth, modified profile; and Process P3: Welding a combustor ring along an inner surface of the modified profile. In various embodiments, the welding can include fillet welding. As is known in the art, a fillet welt is used to join two pieces of material at approximately a 90 degree angle, e.g., where the materials diverge from one another.

As described herein, the modified profile formed according to various embodiments of the invention can have greater strength, and resistance to cracking, fatigue, etc. than the initial profile, and can provide for enhanced weld adhesion of a combustor ring.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It is further understood that the terms "front" and "back" are not intended to be limiting and are intended to be interchangeable where appropriate.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A method of reinforcing an existing turbomachine combustor aperture, the method comprising:
   broaching the existing aperture in the turbomachine combustor to modify an initial profile of the existing aperture in the turbomachine combustor and form a modified profile,
   wherein the initial profile is substantially co-planar with an outer surface of the turbomachine combustor, and wherein the modified profile protrudes radially outwardly from the outer surface of the turbomachine combustor,
   wherein the initial profile is substantially co-planar with an outer surface of the turbomachine combustor, and wherein the modified profile protrudes radially outwardly from the outer surface of the turbomachine combustor; and
   welding the existing aperture to a combustor ring, wherein the modified profile enhances bonding between the existing aperture and the combustor ring.

2. The method of claim 1, wherein the existing turbomachine combustor aperture includes a mixing aperture for allowing mixing of a combustion gas and air.

3. The method of claim 1, wherein the existing turbomachine combustor aperture includes a dilution aperture for diluting a combustion mixture after a combustion process.

4. The method of claim 1, wherein the broaching includes:
   inserting a broaching tip into the existing aperture; and
   machining the initial profile of the existing aperture to form the modified profile.

5. The method of claim 4, wherein the broaching tip includes a broaching surface.

6. The method of claim 5, wherein the broaching surface includes at least one of a square surface, a round surface, a single keyway surface, a double keyway surface, a 4-spline surface, a hexagon surface, a rectangular surface, a double-cut surface, an internal gear surface, a round helical surface or a helical groove surface.

7. The method of claim 1, wherein the modified profile includes a greater surface area than the initial profile.

8. The method of claim 1, further comprising machining the modified profile to form a smooth, modified profile prior to the welding.

9. The method of claim 1, wherein the welding includes fillet welding.

10. A method of reinforcing an aperture in a turbomachine combustor, the method comprising:
   forming the aperture in a surface of the turbomachine combustor;
   broaching the aperture in the turbomachine combustor to modify an initial profile of the aperture in the turbomachine combustor and form a modified profile, wherein the broaching includes:
      inserting a broaching tip having a broaching surface into the existing aperture; and
      machining the initial profile of the existing aperture to form the modified profile,
      wherein the modified profile includes a greater surface area than the initial profile; and
   machining the modified profile to form a smooth, modified profile,
   wherein the initial profile is substantially co-planar with an outer surface of the turbomachine combustor, and wherein the smooth modified profile protrudes radially outwardly from the outer surface of the turbomachine combustor.

11. The method of claim 10, wherein the aperture includes a mixing aperture for allowing mixing of a combustion gas and air.

12. The method of claim 10, wherein the aperture includes a dilution aperture for diluting a combustion mixture after a combustion process.

13. The method of claim 10, wherein the broaching surface includes at least one of a square surface, a round surface, a single keyway surface, a double keyway surface, a 4-spline surface, a hexagon surface, a rectangular surface, a double-cut surface, an internal gear surface, a round helical surface or a helical groove surface.

14. The method of claim 10, further comprising forming a welded collar coupled to the modified profile and extending radially outwardly from the modified profile.

15. The method of claim 10, further comprising fillet welding a combustor ring to the smooth modified profile to form a weld reinforcing the existing aperture, wherein the greater surface area enhances bonding between the existing aperture and the weld after the fillet welding.

* * * * *